United States Patent
Shulman et al.

(10) Patent No.: US 10,004,247 B2
(45) Date of Patent: *Jun. 26, 2018

(54) PROCESS FOR THE PREPARATION OF HUMAN MILK FAT SUBSTITUTES

(71) Applicant: ENZYMOTEC LTD., Migdal Haemeq (IL)

(72) Inventors: Avidor Shulman, Kiryat Tivon (IL); Gai Ben Dror, Moshav Ofer (IL); Hala Laouz, Kfar Kana (IL); Dov Yaakobi, Hasolelim (IL); Zohar Bar-On, Ramat Zvi (IL); Gregory Blinder, Kiryat Motzkin (IL); Iris Meiri-Bendek, Shimshit (IL); Yael Herzog, Nesher (IL)

(73) Assignee: ENZYMOTEC LTD., Migdal Haemeq (IL)

( * ) Notice: Subject to any disclaimer, the term of this patent is extended or adjusted under 35 U.S.C. 154(b) by 135 days.

This patent is subject to a terminal disclaimer.

(21) Appl. No.: 15/149,278

(22) Filed: May 9, 2016

(65) Prior Publication Data

US 2016/0249665 A1 Sep. 1, 2016

Related U.S. Application Data

(63) Continuation of application No. 11/912,946, filed as application No. PCT/IL2006/000511 on Apr. 27, 2006, now Pat. No. 9,332,771.

(30) Foreign Application Priority Data

Apr. 27, 2005 (IL) .......................................... 168263

(51) Int. Cl.
| | | |
|---|---|---|
| *A23D 9/00* | (2006.01) | |
| *C11C 3/08* | (2006.01) | |
| *C11C 3/10* | (2006.01) | |
| *A23L 33/00* | (2016.01) | |
| *A23L 33/115* | (2016.01) | |

(52) U.S. Cl.
CPC .............. *A23D 9/00* (2013.01); *A23L 33/115* (2016.08); *A23L 33/30* (2016.08); *A23L 33/40* (2016.08); *C11C 3/08* (2013.01); *C11C 3/10* (2013.01); *A23V 2002/00* (2013.01)

(58) Field of Classification Search
CPC .................................... A23D 9/00; C11C 3/08
See application file for complete search history.

(56) References Cited

U.S. PATENT DOCUMENTS

| | | | |
|---|---|---|---|
| 4,876,107 A | 10/1989 | King et al. | |
| 5,371,253 A | 12/1994 | Cooper | |
| 5,508,048 A | 4/1996 | Padley | |
| 5,658,768 A | 8/1997 | Quinlan | |
| 5,709,888 A * | 1/1998 | Gil | A23C 11/04 424/522 |
| 5,972,412 A | 10/1999 | Sassen et al. | |
| 6,034,130 A | 3/2000 | Wang et al. | |
| 6,096,351 A | 8/2000 | Sassen | |
| 6,297,279 B1 | 10/2001 | Wang et al. | |
| 2004/0013787 A1 | 1/2004 | Theuer | |
| 2007/0218169 A1 | 9/2007 | Meiri-Bendek et al. | |

FOREIGN PATENT DOCUMENTS

| | | |
|---|---|---|
| EP | 0 209 327 | 1/1987 |
| EP | 0 376 628 A2 | 7/1990 |
| EP | 0 496 456 | 7/1992 |
| EP | 0893064 | 1/1999 |
| JP | 0670786 | 3/1994 |
| RU | 2205546 | 6/2003 |
| WO | 9426855 | 11/1994 |
| WO | 95/31110 | 11/1995 |
| WO | 2005/036987 | 4/2005 |

OTHER PUBLICATIONS

Machine Translation of Abstract of JP6070786A, Aug. 24, 2016.
Lopez-Lopez, A., European Journal of Clinical Nutrition, 2002, pp. 1242-1254, vol. 56.
Hamosh, M. Nutrition, 1990, pp. 421-428, vol. 6.
Mattson, F.H. and Beck, L.H. J. Biol. Chem., 1956, pp. 735-740, vol. 219.
Jensen, C. et al, Am. J. Clin. Nutr. 1986, pp. 745-751, vol. 43.
Small, D.M. Annu. Rev. Nutr., 1991, pp. 413-434, vol. 11.
Lien, E.L. et al., J. Ped. Gastr. Nutr., 1995, pp. 167-174, vol. 25 (2).
Carnielli, V.P. et al., Am. J. Clin. Nutr., 1995, pp. 1037-1042, vol. 61.
Innis, S.M. et al, Am. J. Clin. Nutr., 1993, pp. 382-390, vol. 57.
Filer, L.J. et al, J. Nutr., 1969, pp. 293-298, vol. 99.
Chappel, J.E. et al. J. Prediatr., 1986, pp. 439-447, vol. 108.
Hanna, F.M. et al., Pediatr., 1970, pp. 216-224, vol. 45(2).
Tomarelli, R.M. et al, J. Nutr. 1968, pp. 583-590, vol. 95.
Hernel, O. et al., Perinatal Nutritin, 1988, pp. 259-272, New York, Academic Press.

(Continued)

*Primary Examiner* — Jenna A Watts
(74) *Attorney, Agent, or Firm* — Paul D. Bianco; Katharine Davis; Fleit Gibbons Gutman Bongini & Bianco PL

(57) ABSTRACT

Disclosed are human milk fat (HMF) substitutes, processes for preparation thereof, uses thereof, and fat blends and formula containing the HMF substitutes. A fat base composition of the invention includes a mixture of vegetable-derived triglycerides, with less than 50% of the fatty acid residues bonded at the sn-2 position being saturated; and/or with the amount of saturated fatty acid residues bonded at the sn-2 position of the glycerol backbone less than about 43.5% of the total amount of the fatty acid residues. Typically, substantially all of the saturated fatty acids bonded at the sn-2 position of the glycerol backbone are palmitic acid residues. Also disclosed are substitute HMF compositions including a blend of at least 25% or at least 30% of the fat base composition of the invention with up to 75%, or respectively up to 70%, of at least one vegetable oil. Processes for preparing the fat base compositions and blend are also disclosed. Further disclosed are infant formulas including the fat base composition or substitute human milk fat composition.

6 Claims, No Drawings

(56) References Cited

OTHER PUBLICATIONS

Wang, C.S. et al., J. Biol. Chem., 1983, pp. 9197-9202. vol. 258.
Lopez-Lopez, A. et al., Early Hum. Dev. 2001, pp. S83-S94, vol. 65.
Nelson, S.E. et al., Am. J. Clin. Nutr. 1996, pp. 291-296, vol. 64.
Innis, S.M. et al, J. Nutr. 1995-, pp. 73-81, vol. 125.
Innis, S.M. et al., Lipids, 1994, pp. 541-545, vol. 29 (8).
Ostrom, K.M. et al., J. Am. Coll. Nutr., 2002, pp. 564-569, vol. 21(6).
Nelson, S.E. et al., J. Am. Coll. Nutr., 1998, pp. 327-332, vol. 17.
Lucas, A. et al., Arch Dis. Child, 1997, pp. F178-F187, vol. 77.
Carnielli, V.P. et al. J. Pediatr. Gastroenterol. Nutr. 1996, pp. 553-560, vol. 23.
Quinlan, P.T. et al, J. Pediatr. Gast. Nutr., 1995, pp. 81-90, vol. 20.
Widdowson, E.M., Br. Med. J., 1975, pp. 653-655, vol. 1.
Carlson, S.E. et al, Am. J. Clin. Nutr., 1986, pp. 798-804, vol. 44.
Innis, S.M. et al. Am. J. Clin. Nutr., 1990, pp. 994-1000, vol. 51.
Koletzko, B. et al, Eur. J. Pediatr., 1989, pp. 669-675, vol. 148.
Putnam, J.C. et al. Am. J. Clin. Nutr., 1982, pp. 106-114, vol. 36.
Innis, S.M. et al, Am. Coll. Nutr., 1992, pp. 63S-68S, vol. 11.
Van Biervliet, J.P. et al, Acta Paediatr. Scand., 1981, pp. 851-856, vol. 70.
Tantibhedhyangkul and Hashim, Pediatrics, 1978, pp. 537-545, vol. 61(4).
Finley and Davidson, Pediatrics, 1980, pp. 132-138, vol. 65 (1).
Lien, J. Pediatr. 1994, pp. S62-S68, vol. 125(5).
Zock et al. "Partial conservation of the sn-2 position of dietary triglycerides in fasting plasma lipids in humans", European Journal of Clinical Investigation (1996) 26, 141-150).
"Gras Notification of Betapol". Center for Food Safety and Applied Nutrition, Food and Drug Administration. Available May 28, 2003. pp. 1-54.
V.S. Stopskii, V.V. Klyuchkin, N.V. Andreev Chemistry of Fats and Fat Stock processing Products, "Kolos" . Publication, 1992.
"About Palm Oil," retrieved online Apr. 24, 2014 www.palmoilworld.org, p. 1-9.

\* cited by examiner

PROCESS FOR THE PREPARATION OF HUMAN MILK FAT SUBSTITUTES

FIELD OF THE INVENTION

The present invention relates to human milk fat substitutes, processes for their preparation, uses thereof and fat blend and infants formulae containing them.

BACKGROUND OF THE INVENTION

All publications mentioned throughout this application are fully incorporated herein by reference, including all references cited therein.

Lipids in general are the building blocks of life. They are used as building blocks of membranes, cells and tissues, as energy sources, either immediate or stored, as precursors to a variety of other bio-molecules, as well as biochemical signals. In all biochemical processes lipids have an important role.

Many lipids, and especially triglycerides, are consumed in the human nutrition on a daily basis. In most cases, these lipids are metabolized and used for energy storage, precursors for biosynthesis of other lipids or bio-molecules. Whatever the fate of the lipids in the metabolic pathways, during and after their consumption, they interact with other nutrients or their metabolic products.

In human milk, and in most infant formulas, about 50% of the dietary calories are supplied to newborns as fat. More than 98% of this milk fat is in the form of triglycerides, which contain saturated and unsaturated fatty acids esterified to glycerol.

Fatty acids in human milk fat have a highly specific positional distribution on the glycerol backbone. This specific configuration is known to have a major contribution to the efficiency of nutrient absorption.

Palmitic acid (C16:0) is the predominant saturated fatty acid (SAFA), constituting 20-25% of the fatty acids in mature human milk. 70-75% of this fatty acid are esterified at the sn-2 position of the triglycerides. In contrast, palmitic acid present in vegetable oils, which are most commonly used in the manufacture of infant formulas, is esterified at the sn-1 and sn-3 positions, while the sn-2 position is predominantly occupied by unsaturated fatty acids.

Linoleic (18:2) and linolenic (C18:3) acids cannot be synthesized in animal tissues and must be obtained from the diet, i.e. ultimately from plants. There is an absolute requirement for these so called "essential fatty acids" for growth, reproduction and good health. In triglycerides in human mother milk, 5-20% of the total C18:3 and 20-23% of the total C18:2 are esterified at the sn-2 position of the glycerol backbone [Lopez-Lopez A. (2002) *European Journal of Clinical Nutrition;* 56:1242-54, Innis S. M. (1994) *Lipids;* 29:541-5].

Triglyceride Digestion by the Infant

The triglyceride digestive process of the neonate is complex. It is initiated by a gastric phase catalyzed by gastric or lingual lipase [Hamosh M. (1990) *Nutrition;* 6:421-8]. This initial lipolysis allows maximal activity of pancreatic colipase-dependent lipase during the intestinal phase of digestion. The pancreatic lipase system attacks the triglyceride with a high degree of positional specificity. Lipolysis occurs predominantly at the sn-1 and sn-3 positions, yielding two free fatty acids and a 2-monoglyceride [Mattson F. H. & Beck L. H. (1956) *J. Biol. Chem.;* 219:735-740]. Monoglycerides are well absorbed independent of their constituent fatty acid. In contrast, the absorption of free fatty acids varies greatly, depending on their chemical structure. Mono and polyunsaturated fatty acids are well absorbed, as are saturated fatty acids of 12 carbons or less in chain length. The coefficient of absorption of free long chain saturated fatty acids i.e. palmitic acid is relatively low [Jensen C. et al. (1988) *Am. J. Clin. Nutr.;* 43:745-51], due in part to a melting point above body temperature (~63° C.) and the tendency of these fatty acids to form hydrated fatty acid soaps with minerals such as calcium or magnesium at the pH of the intestine [Small D. M. (1991) *Annu. Rev. Nutr.;* 11:413-434].

Several studies have demonstrated the preferential absorption of palmitic acid when present at the triglyceride sn-2 position [Lien E. L. et al. (1997) *J. Ped. Gastr. Nutr.;* 52(2):167-174; Carnielli V. P. et al. (1995) *Am. J. Clin. Nutr.;* 61:1037-1042; Innis S. M. et al. (1993) *Am. J. Clin. Nutr.;* 57:382-390; Filer L. J. et al. (1969) *J. Nutr.;* 99:293-8]. Studies comparing the palmitic acid absorption of human milk and formulas conclude that the absorption of palmitic acid is higher in human milk [Chappel J. E. et al. (1986) *J. Pediatr.;* 108:439-447; Hanna F. M. et al. (1970) *Pediatr.;* 45:216-224; Tommarelli R M., et al. (1968) *J. Nutr.;* 95:583-90]. The greater absorption of fat and calcium in breast-fed infants compared with those fed formula has been ascribed to two factors: the presence of a lipolytic enzyme (the bile salt-stimulated lipase) in breast milk and the relatively high proportion of palmitic acid at the sn-2 position of the triglyceride [Hernell O. et al. (1988) *Perinatal Nutrition.* New York: Academic Press.; 259-272; Wang C. S. et al. (1983) *J. Biol. Chem.;* 258:9197-9202]. Higher palmitic acid absorption was obtained with formulas rich in palmitic acid esterified in the sn-2 position of the triglycerides, than with those containing palmitic acid predominantly esterified in the sn-1,3 positions [López-López A. et al. (2001) *Early Hum. Deo.;* 65:S83-S94].

A study comparing the absorption of fat and calcium by infants fed a formula containing a blend of palm olein and soy oil (high levels of palmitic acid at the sn-1,3 positions) and a formula containing a blend of soy oil and coconut oil (low levels of palmitic acid) showed that the mixture of palm olein and soy oil, although providing the proportion of palmitic and oleic acids similar to those of human milk fat, was less absorbed [Nelson S E. et al. (1996) *Am. J. Clin. Nutr.;* 64:291-296]. Another study showed that fat absorption in infants fed formula containing lard was reduced when the high proportion of sn-2 palmitin in lard was reduced to 33% by chemical randomization [Filer (1969) id ibid.].

The composition of monoglycerides absorbed from the intestinal lumen is important to the fatty acid distribution of circulating lipids because about 70% of the fatty acids absorbed as sn-2 monoglycerides are conserved in the original position during re-esterification to form triglycerides in the intestinal cells [Small (1991) id ibid.].

Studies in piglets provided evidence that palmitic acid, when absorbed from milk or formula with rearranged triglycerides as a sn-2 monoglyceride, is conserved through the process of triglyceride reassembly in the enterocyte and secretion in plasma lipoprotein triglycerides [Innis S. M. et al. (1995) *J. Nutr.;* 125:73-81]. It has also been shown that the distribution of saturated fatty acids in human milk and infant formula is a determinant of the fatty acid distribution of infant plasma triglycerides and phospholipids [Innis S. M. et al. (1994) *Lipids.;* 29:541-545].

During the first year of life an infant's birth weight triples and the length is increased by 50%. To meet the requirements of their rapidly expanding skeletal mass, growing infants require a bioavailable source of calcium. For formula-fed infants, availability of calcium depends on the composition of the formula [Ostrom K. M. et al. (2002) *J. Am. Coll. Nutr.;* 21(6):564-569].

As mentioned above, the digestion of triglycerides involves lipolysis at the sn-1 and 3 positions and formation of free fatty acids and 2-monoglycerides. When palmitic acid is located at the sn-1,3 positions, as is the case in most infant formulas, it is released as free fatty acid which tends to form insoluble calcium soaps. In contrast, palmitic acid esterified to the sn-2 position, as in human milk, is unavailable to form calcium soaps [Small (1991) id ibid.].

Several studies have shown a correlation between formulas containing high levels of palmitic acid situated at the sn-1,3 positions of the triglyceride and reduction in calcium absorption [Nelson S. E. et al. (1998) *J. Amer. Coll. Nutr.;* 17:327-332; Lucas A. et al. (1997) *Arch. Dis. Child.;* 77:F178-F187; Carnielli V. P. et al. (1996) *J. Pediatr. Gastroenterol. Nutr.* 23:553-560; Ostrom (2002) id ibid.;

Hanna (1970) id ibid.]. In addition, it was shown that dietary triglycerides containing palmitic acid predominantly at the sn-2 position, as in human milk, have significant beneficial effects on the intestinal absorption of fat and calcium in healthy term infants as well as in preterm infants [Carnielli (1996) id ibid.; Carnielli (1995) id ibid.; Lucas (1997) id ibid.]. Infants fed a formula containing high levels of palmitic acid at the sn-1,3 positions showed greater fecal excursion of calcium and, hence, a lower percentage absorption of calcium compared to infants fed a formula containing low levels of palmitic acid [Nelson (1996) id ibid.]. Fecal excretion of calcium was closely related to the fecal excretion of fat. This study also showed that urinary phosphorus excretion increased and phosphorus retention decreased when infants were fed the formula containing high levels of palmitic acid at the sn-1,3 positions. These findings presumably reflect lower availability of calcium for deposition in bones.

The impact of soap formation on calcium absorption can be significant. Many infant formulas contain sufficient saturated fatty acids to form soaps with virtually all the calcium available.

Another important issue which is associated with formula feeding is constipation in both term and preterm infants which, in the latter, can lead to life threatening complications. By contrast, constipation is rare in breast fed term infants. A study comparing breast fed and formula fed infant stool hardness and composition showed that calcium fatty acid soaps are positively correlated to stool hardness. Stools from formula-fed infants were significantly harder than those of the breast-fed infants suggesting different handling of saturated fatty acids [Quinlan P T. et al. (1995) *J. Pediatr. Gastr. and Nutr.;* 20:81-90].

In an attempt to overcome the decreased calcium absorption and hard stool phenomena, infant formula manufacturers tend to deviate from the fatty acid profile by replacing palmitic acid with lauric acid and, in some cases, by increasing the polyunsaturated fatty acid content. Studies have shown that fatty acid composition of the diet influences the fatty acid composition of developing infant tissue [Widdowson E. M. (1975) *Br. Med. J.;* 1:633-5; Carlson S. E. et al. (1986) *Am. J. Clin. Nutr.;* 44:798-804; Innis S. M. et al. (1990) *Am. J. Clin. Nutr.;* 5:994-1000; Koletzko B. et al. (1989) *Eur. J. Pediatr.;* 148:669-75] and thus the lipoprotein and lipid metabolism differ between breast-fed and formula-fed infants [Putnam J. C. et al. (1982) *Am. J. Clin. Nutr.;* 36:106-114; Innis S. M. et al. (1992) *Am. Coll. Nutr.;* 11:63S-8S; Van Biervliet J. P. et al. (1981) *Acta. Paediatr. Scand.;* 70:851-6].

Innis and colleagues [Innis (1993) id ibid.], when comparing three formulas containing similar amounts of saturated fatty acids—C8-C14, C16 from palm oil (predominantly in the sn-1,3 positions), or C16 from synthesized triglyceride (predominantly in the sn-2 position)—showed that the chain length of saturated fatty acids in infant formula influences the metabolism of the dietary oleic, linoleic and alpha-linolenic acids. This study also showed that the sn-2 configuration of C16 in human milk triglycerides seems to have unique properties that extend beyond absorption. These include effects on HDL and cholesterol concentrations, and the cholesterol ester fatty acid composition.

EP 0 209 327 describes a substitute milk fat composition which is suitable for use as replacement fat in infant formulations. In the claimed fat composition at least 43.5% of the total saturated fatty acids residues are bound to the sn-2 position of the triglycerides. Additionally, at least 50% of the fatty acids occupying the sn-2 position are saturated. The fat composition of this patent is produced from an oil or fat characterized by high levels of saturated fatty acids, specifically palmitic acid.

EP 0 495 456 also discloses substitute human milk fat compositions. The claimed compositions have at least 40% of the total saturated fatty acids located at the sn-2 position of the triglycerides contained in the composition. These fat composition are also characterized by comprising 0.2-7% of linolenic acid moieties (C18:3, ω-3), 70% of which are bonded at the sn-1 and 3-positions of the glycerol moieties. The fat composition of EP 0 495 456 is also produced by transesterifications of a triglyceride source rich in saturated fatty acids, specifically palmitic acid. This source, such as top fraction of palm oil, can contain palmitic acid at levels higher than 80% and even 90%.

U.S. Pat. No. 5,658,768 discloses a multiple-step process for preparing triglyceride compositions in which more than 40% of the saturated fatty acid moieties are at the sn-2 position. Many of the steps involve enzymatic modifications.

Applicant's WO2005/036987 describes a fat composition which can be used to create human milk fat substitutes which have great similarity to human milk fat and/or can be used at relatively low levels to yield such human milk fat substitutes. This composition is also produced starting from triglycerides sources rich in palmitic acid.

While the fat compositions described above can be used in the preparation of human milk fat substitutes with high level of similarity to human milk fat (HMF), which in turn can be used in the creation of advanced infant formulas, the resulting HMF substitutes may be extremely expensive, making them impractical for the use in the preparation of commercial infant formulas.

The inventors of the current invention have addressed the issue of cost by producing a unique fat composition, described in said WO2005/036987, offering HMF substitutes with still high levels of similarity to HMF, by using relatively low levels of the synthetic fat-base composition of that invention in the total fat blend used in the infant formula.

Another approach of overcoming the cost obstacle provides HMF substitutes that offer a relatively high degree of the total saturated fatty acids located at the sn-2 position, yielding fat compositions with more than 40% of their total saturated fatty acids positioned at the sn-2 position (but less than 50%). Such HMF substitutes were produced by high degree of dilution of fat-base compositions, such as described by EP 0 209 327 or EP 0 495 456, with simple and cost-effective vegetable oils. These blends, however, have a lower ratio of sn-2 palmitic to total palmitic (~40-43%) than can be found in HMF (~70%). Nevertheless, clinical studies [Lien et al. *Journal of Pediatric Gastroenterology and Nutrition* 1997, 167-74] have shown that these blends offer a higher calcium and fatty acid intake than infant formulas based on mere blends of vegetable oils. Substitutes which are very close to human milk fat are described in applicant's said WO2005/036987 [InFat 1, Table 1]. In all cases, these HMF substitutes, characterized in having at least 40% of their saturated fatty acids located at the sn-2 position, are obtained by diluting fat-bases with high levels of sn-2 palmitic acid, as well as a high ratio of sn-2 palmitic to total palmitic acid, with a variety of vegetable triglycerides to obtain a blend in which at least 40% of the saturated fatty acids are bound at the sn-2 position. This ratio is usually between 40 to 45%. The fat bases used in the preparation of these HMF substitutes are produced by interesterifying triglycerides rich in palmitic acid with an excess of a mixture of free fatty acids, rich in oleic acid.

It is the object of the present invention to provide novel fat-base compositions, which would possess the benefits of good HMF mimics, yet be cost effective to produce.

It is a further object of the invention to provide novel processes for the low-cost production of HMF mimetic fat bases and fat blend suitable for use in various infant formulas.

These and other objects of the invention will become apparent as the description proceeds.

SUMMARY OF THE INVENTION

In a first aspect, the present invention relates to an enzymatically prepared fat base composition comprising a mixture of vegetable-derived triglycerides, characterized in that less than 50% of the fatty acid residues bonded at the sn-2 position are saturated; and/or the amount of saturated fatty acid residues bonded at the sn-2 position of the glycerol backbone is less than about 43.5% of the total amount of saturated fatty acid residues; wherein said fatty acid residues are C12, C12, C16 or C16 acids, optionally other fatty acids, and any mixture thereof comprising at least two acids.

In a preferred embodiment of the fat base composition of the invention, substantially all of the saturated fatty acids bonded at the sn-2 position of the glycerol backbone are palmitic acid residues. In particular, at least 60%, preferably at least 75%, more preferably at least 85% of the saturated fatty acids at the sn-2 position of the glycerol backbone are palmitic acid residues.

In a specific embodiment of the fat base composition of the invention at least 40%, preferably 45-65%, of the unsaturated fatty acid moieties at the sn-1 and sn-3 positions are oleic acid moieties. Particularly, at least 45%, preferably 54-65%, of the unsaturated fatty acid moieties at the sn-1 and sn-3 positions are oleic acid moieties. Alternatively, at least 35%, preferably 40-52%, of said unsaturated fatty acid moieties at the sn-1 and sn-3 positions are oleic acid moieties.

In addition, in the fat base composition of the invention at least 5%, preferably 7-15%, of the unsaturated fatty acid moieties at the sn-1 and sn-3 positions may be linoleic acid moieties. Specifically, at least 9%, preferably 10-20%, of the unsaturated fatty acid moieties at the sn-1 and sn-3 positions are linoleic acid moieties. Alternatively, at least 4%, preferably 5-10%, of the unsaturated fatty acid moieties at the sn-1 and sn-3 positions are linoleic acid moieties.

In another specific embodiment of the fat base composition of the invention, from about 0.2 to about 15%, preferably from about 7% to about 14%, more preferably from about 11% to about 12.5% of the total fatty acid moieties at the sn-1 and sn-3 positions are lauric acid moieties.

In a further aspect, the invention relates to a substitute human milk fat composition comprising a blend of at least 25% or at least 30% of the fat base composition of the invention with up to 75%, or respectively up to 70%, of at least one vegetable oil. The vegetable oil may be selected from the group comprising soy oil, palm tree oil, canola oil, coconut oil, palm kernel oil, sunflower oil, corn oil and rapeseed oil, but is not limited thereto. These oils may be randomized before mixing with the fat base composition, as detailed below.

In specific embodiments of the substitute human milk fat composition of the invention, from about 33% to about 45%, preferably about 36% to about 43%, even more preferably about 40% of the total palmitic acid residues are bonded at the sn-2 position of the glycerol backbone.

In a further aspect, the invention relates to an infant formula comprising the fat base composition or substitute human milk fat composition of the invention, particularly an infant formula comprising at least one protein component and at least one fat component, wherein said fat component is the fat base composition or substitute human milk fat composition of the invention, the formula optionally also comprising vitamins, minerals, nucleotides, amino acids and carbohydrates, and any other nutritionally beneficiary constituents.

In a further aspect the invention relates to a first process for the preparation of the fat base composition of the invention, as defined above, the process comprising the steps of:

(a) reacting a triglyceride mixture that has substantially low content of saturated, preferably palmitic acid, preferably less than 60% out of the total fatty acids, more preferably less than 57%, even more preferably less than 53%, with free unsaturated fatty acids source, rich in oleic acid, in the presence of an insoluble catalyst, wherein the ratio of said free fatty acids to said glyceride mixture is from about 1.5:1 to about 1:1;
(b) removing the catalyst;
(c) distilling the excess free fatty acids;
(d) optionally bleaching the oil; and
(e) optionally deodorizing the product of step (d).

Optionally, the triglyceride mixture is randomized prior to the reaction in order to enrich the sn-2 position with saturated fatty acids (by increasing the share of saturated fatty acids bonded at the sn-2 position). Randomization may be performed chemically, by using basic or acidic catalyst, or enzymatically, by using a non-selective lipase.

This first process of the invention may optionally further comprise a step of fractionation preceding the deodorization step (e).

The triglyceride mixture used in this process of the invention may preferably contain from 48-57% saturated fatty acids, preferably palmitic acid.

The free fatty acids source used in this process of the invention may preferably comprise about 2-5% C16:0, 60-80% C18:1 and 1-4% C18:0 fatty acids.

In yet a further embodiment, the invention relates to a process for the preparation of the substitute human milk fat composition of the invention, as defined above, this process comprising admixing a fat base composition of the invention with at least one vegetable oil, preferably at a ratio of from about 0.4:1 to about 4:1, to give a blend wherein the amount of saturated fatty acid residues bonded at the sn-2 position of the glycerol backbone is from about 33% to about 43.5, preferably about 43% more preferably about 40% of the total amount of saturated fatty acid residues.

Alternatively, the fat base composition of the invention is admixed with the vegetable oil at a ratio of from about 2.3:1 to about 1:1, resulting in a blend wherein the amount of saturated fatty acid residues bonded at the sn-2 position of the glycerol backbone is from about 33% to about 40% of the total amount of saturated fatty acid residues.

The admixed vegetable oils used for preparing a substitute human milk fat are optionally randomized to have 33% of the palmitic acid residues esterified at the sn-2 position. The randomization enables to significantly decrease the amount of fat base needed for preparing a substitute milk fat composition for infant formulae which possesses the desired ratio of saturated fatty acid residues bonded at the sn-2 position out of the total amount of saturated fatty acid residues. This embodiment is of major financial importance. As mentioned, the randomization of the admixed vegetable oils may be performed chemically using basic or acidic catalyst, or enzymatically using a non-selective lipase.

In yet another aspect, the invention relates to a second process for the preparation of the fat base composition of the invention, as defined above, the process comprising the steps of:
(a) reacting a triglyceride mixture that has high palmitic acid content, preferably at least 70% out of the total fatty acids, more preferably at least 80%, with an identical or smaller weight amount of a free unsaturated fatty acids source that is rich in oleic and saturated fatty acids of 14 carbons atoms or less, preferably lauric acid, in the presence of an insoluble catalyst, wherein the ratio of said free fatty acid to said glyceride mixture is from about 1:1 to about 2:1;
(b) removing the catalyst;
(c) distilling the excess free fatty acids;
(d) optionally bleaching the oil; and
(e) optionally deodorizing the product of step (d).

As in the first process of the invention, the triglycerides mixture is optionally randomized prior to the reaction in order to enrich the saturated fatty acid moieties at the sn-2 position of the glycerol backbone. The randomization may be performed by a standard interesterification process, either chemically by using acidic or basic catalyst (e.g. sodium methoxide) or enzymatically by using a non-selective lipase.

In this second process of the invention, the said free unsaturated fatty acids source preferably contains from about 10% to about 25% saturated fatty acids of 14 carbons atoms or less, preferably lauric acid.

The second process of the invention may also optionally further comprise a step of fractionation preceding the deodorization step (e).

In specific embodiments of the second process of the invention, the triglyceride mixture may contain at least 75% of palmitic acid. The free fatty acids source may contain about 5-25% C12:0, 0.05-2% C14:0, 1-5% C16:0, 55-75% C18:1 and 1-5% C18:0 fatty acids of total fatty acids.

In yet a further aspect, the invention relates to a process for the preparation of the substitute human milk fat composition of the invention, as defined above, this process comprising admixing a fat base composition of the invention with at least one vegetable oil, preferably at a ratio of from about 0.4:1 to about 4:1, to give a blend wherein the amount of saturated fatty acid residues bonded at the sn-2 position of the glycerol backbone is from about 33% to about 43.5, preferably about 43%, more preferably about 40% of the total amount of saturated fatty acid residues.

Alternatively, the fat base composition of the invention is admixed with the vegetable oil at a ratio of from about 2.3:1 to about 1:1, resulting in a blend wherein the amount of saturated fatty acid residues bonded at the sn-2 position of the glycerol backbone is from about 33% to about 40% of the total amount of saturated fatty acid residues.

Also in these embodiments, the admixed vegetable oils are optionally randomized so as to have about 33% of the total palmitic acid residues esterified at the sn-2 position. The randomization enables to significantly reduce the amount of fat base needed to obtain the desired ratio of saturated fatty acid residues bonded at the sn-2 position out of the total amount of saturated fatty acid residues in the resulting substitute HMF preparation. The randomization of the admixed vegetable oils may be performed chemically using basic or acidic catalyst, or enzymatically using a non-selective lipase.

In another aspect, the invention relates to a process for the preparation of a HMF mimetic composition, comprising the steps of:
(a) reacting a triglyceride mixture that has at least 30% palmitic acid content out of the total fatty acids, preferably at least 40%, more preferably above 50%, even more preferably above 70%, with free fatty acids source that contains less than 10% palmitic acid out of the total free fatty acids, preferably less than 5%, in the presence of an insoluble catalyst; the ratio of said free fatty acid to said glyceride mixture being from about 5:1 to about 1:1;
(b) removing the catalyst;
(c) distilling the excess free fatty acids;
(d) optionally bleaching the oil; and
(e) optionally deodorizing the product of step (d).

The obtained product has 0-20% C12:0 fatty acids out of the total fatty acids, preferably 10-15%; 0-15% C14:0 fatty acids out of the total fatty acids, preferably 5-10%; 8-30% C16:0 fatty acids out of the total fatty acids, preferably 20-25%; 1-6% C18:0 fatty acids out of the total fatty acids, preferably 3-5%; 20-50% C18:1 fatty acids out of the total fatty acids, preferably 30-40%; 5-30% C18:2 fatty acids out of the total fatty acids, preferably 10-20%; 0.2-4% C18:3 fatty acids out of the total fatty acids, preferably 1.5-3%; other fatty acids are present in levels of less than 10% of the total fatty acids, preferably less than 5%. A major advantage of this product is that it is suitable, without any further blending, for use as an ingredient to infant formulas.

Optionally, the source triglyceride mixture is randomized, either chemically or enzymatically, prior to the reaction in order to enrich the saturated fatty acids moieties at the sn-2 position.

The invention also relates to a fat composition which is similar to and can serve as a substitute for HMF obtainable by the process of the invention. Such HMF substitute composition may preferably be characterized by a fatty acid profile suitable for infant nutrition, preferably mimicking the fatty acid profile of HMF, most preferably minimizing loss of calcium through fatty acid soap formation, wherein said composition has an sn-2 saturated to total saturated fatty acids of at least 33%, preferably at least 40%, more preferably above 45%, even more preferably above 50%, most preferably above 59%. This composition has a sn-2 palmitic to total palmitic ratio of at least 40%, preferably above 43%, more preferably above 45%.

Still further, the invention relates to the use of a fat base composition of the invention, or prepared by any of the processes of the invention, in the preparation of a substitute human milk fat composition for infant formulas.

In a still further aspect, the invention relates to a process for the preparation of a substitute HMF composition. This process comprises admixing a suitable fat base composition with at least one vegetable oil, wherein the vegetable oil is randomized prior to being mixed with the fat base composition. A suitable fat base is a mixture of structured lipids, produced by reacting glycerides with free fatty acids, in the presence of a stereospecific selective lipase. This fat base has 0-20% C12:0 fatty acids out of the total fatty acids, preferably 10-15%; 0-15% C14:0 fatty acids out of the total fatty acids, preferably 5-10%; 20-55% C16:0 fatty acids out of the total fatty acids, of which above 38% are esterified at the sn-2 position; 1-7% C18:0 fatty acids out of the total fatty acids, preferably 3-5%; 25-65% C18:1 fatty acids out of the total fatty acids, preferably 30-40%; 2-40% C18:2 fatty acids out of the total fatty acids, preferably 10-20%; 0-8% C18:3 fatty acids out of the total fatty acids, preferably 1.5-3%; other fatty acids are present in levels of less than 8% of the total fatty acids, preferably less than 5%.

The vegetable oil may be selected from the group consisting of soy oil, palm tree oil, canola oil, coconut oil, palm kernel oil, sunflower oil, corn oil and rapeseed oil, but is not limited thereto.

In this aspect the admixed vegetable oils used for preparing a substitute human milk fat are randomized. The randomization yields an oil having 33% of its palmitic acid residues esterified at the sn-2 position of the glycerol backbone. The randomization enables to significantly decrease the amount of fat base needed for preparing a substitute milk fat composition for infant formulas which possesses the desired ratio of saturated fatty acid residues bonded at the sn-2 position out of the total amount of saturated fatty acid residues. This embodiment is of major financial importance. As in the other embodiments described above, the randomization of the admixed vegetable oils may be performed chemically using basic or acidic catalyst, or enzymatically using a non-selective lipase.

The randomization of the blending oils has, inter alia, another important aspect besides cost-effectiveness. Randomized blending oils may contribute to γ-linolenic acid (C18:3) and linoleic acid (C18:2) distribution with higher similarity to HMF, in comparison with the natural oil contribution.

The fat base composition and oil/s are mixed at a suitable ratio, which may be determined by the desired profile of the resulting blend. For example, the fat base composition and the blending oil/s may be mixed at a ratio of from about 0.13:1 to about 4:1, to give a blend wherein the amount of saturated fatty acid residues bonded at the sn-2 position of the glycerol backbone is from about 33% to about 43.5, preferably about 43%, more preferably about 40% of the total amount of saturated fatty acid residues. Alternatively, the amount of saturated fatty acid residues bonded at the sn-2 position of the glycerol backbone is above 43.5%. The ratio of the ingredients can thus be changed to give a blend with a desired or predetermined fatty acid profile.

In a still further aspect the invention relates to a process for the preparation of a fat base composition suitable for use as an ingredient of infant formula, comprising the steps of (a) reacting a randomized triglyceride mixture which has a suitable profile of fatty acids which has a palmitic acid content of more than about 35% out of the total fatty acids, with a suitable free unsaturated fatty acids source which source has a palmitic acid content of less than 10% out of the total free fatty acids, in the presence of an insoluble catalyst, the ratio of said free fatty acids to said glyceride mixture being from about 7:1 to about 1:1. (b) removing the catalyst; (c) distilling the excess free fatty acids; optionally (d) bleaching the oil; and optionally (e) deodorizing the product of step (d). The randomization of the triglyceride mixture may be performed chemically using basic or acidic catalyst, or enzymatically using a non-selective lipase.

The invention will now be described in more detail on hand of specifically preferred embodiments.

DETAILED DESCRIPTION OF PREFERRED EMBODIMENTS

In search for nutritionally beneficiary, yet cheap to produce HMF substitutes, the present inventors have developed novel fat-base compositions, that are characterized by having less than 50% of their sn-2 fatty acids as saturated. These novel HMF substitutes can be produced by interesterification of relatively low-palmitic acid triglycerides. The fat-base compositions can be used for preparing fat blends (final, ready for use as infants formulas components) which are characterized by a total saturated (specifically palmitic acid) fatty acids level similar to HMF and a ratio of sn-2 saturated (substantially palmitic) fatty acids to total saturated (palmitic) fatty acids higher than 33% and preferably lower than 43.5%, more preferably lower than 40%. This fat-base composition, the process for its preparation and its various uses constitute the first aspect of the present invention.

Thus, in a first embodiment, the present invention relates to the production of a fat concentrate by interesterification process, in which the starting material is not as rich in palmitic acid, as described in the prior art, but a combination of vegetable oils as the triglyceride raw material, having a palmitic acid content of about 50% and total saturated fatty acids content lower than 60%. The compositions of two exemplary triglyceride starting materials are shown in Table 1.

TABLE 1

| | Triglycerides | | | | | |
|---|---|---|---|---|---|---|
| | Palm stearin % w/w in blend Iodine Value 34 | Palm stearin % w/w in blend Iodine Value 15 | Palm oil % w/w in blend | Rapeseed Oil % w/w in blend | % C16 from total fatty acids | % saturated from total fatty acids |
| Example 1 | | 20 | 80 | | 51 | 57.3 |
| Example 2 | 78 | | | 22 | 48.7 | 53.7 |

These raw materials can be used as starting material in an interesterification process, employing suitable specific 1,3-lipases, to produce a fat-base composition, which in turn can be used to produce HMF substitutes (replacers), such as those described above. These substitutes provide limited similarity to HMF by having a ratio of sn-2 palmitic acid to total palmitic acid higher than 33%, thus improving the infant's absorption of calcium and of fatty acids, used as an energy source. These HMF substitutes of the present invention exhibit improved calcium absorption over simple blends of vegetable oils used in infant formulas, have a maximal sn-2 palmitic acid to total palmitic acid ratio of preferably 1:3 (33%), and are produced at lower cost compared to HMF substitutes produced from prior art fat-bases, such as those having a ratio of sn-2 palmitic acid to total palmitic of over 50%.

The low-palmitic raw material triglycerides described above may be randomized before the interesterification (as described below) and further reacted with a free fatty acids mixture containing relatively high quantities of oleic acid, at ratios of 1.5:1 (FFA to triglycerides) as in Example 1, or even as low as 1:1, as in Example 2. It may be noted that prior art compositions usually have ratios of 5:1 or as low as 3:1 (FFA to fat). The fatty acid composition (FAC) of the fat bases produced from the triglycerides of Examples 1 and 2 is described in Table 2.

TABLE 2

| | Example 1 | | | Example 2 | | |
|---|---|---|---|---|---|---|
| Fatty acid | % out of total fatty acids | % at sn-2 out of total sn-2 fatty acids | % in sn-2 from total fatty acid | % out of total fatty acids | % at sn-2 out of total sn-2 fatty acids | % in sn-2 from total fatty acid |
| C12 | 0.8 | 0.4 | 16.7 | 0.2 | 0.2 | 33.3 |
| C14 | 0.7 | 0.9 | 42.9 | 0.6 | 0.9 | 50.0 |
| C16 | 28.4 | 40.8 | 47.9 | 28.1 | 40.4 | 47.9 |
| C18 | 3.6 | 3.9 | 36.1 | 3.6 | 3.8 | 35.2 |
| C18:1 | 51.3 | 42.1 | 27.4 | 54.5 | 42.2 | 25.8 |
| C18:2 | 12.3 | 10.4 | 28.2 | 10.8 | 10 | 30.9 |
| C18:3 | 1.6 | 0.6 | 12.5 | 1.1 | 1.5 | 45.5 |
| C20:0 | 0.3 | 0.3 | 33.3 | 0.3 | 0.3 | 33.3 |
| C20:1 | | 0.2 | | 0.5 | 0.6 | |
| Total SAFA | 33.5 | 46.3 | 46.1 | 32.5 | 45.6 | 46.8 |

Abbreviations:
FAC, fatty acid composition;
SAFA, Saturated Fatty Acids;
FFA, free fatty acid.

In both examples the resulting fat-base has a sn-2 saturated fatty acid (SAFA) content of less than 50% and the ratio of sn-2 palmitic to total palmitic is also below 50%.

These fat bases can be further blended with vegetable oils to produce a final HMF substitute/replacer, with a sn-2 saturated FA to total saturated FA ratio higher than 33% (39.3% when using fat base of Example 2) and sn-2 palmitic to total palmitic ratio of about 44% (44.2% when using fat base of Example 2).

Tables 3 and 4 describe the blending of the fat base of Example 2, with the vegetable oils detailed therein and composition of the blend. The total palmitic acid content is 22%, comparable to the level found in HMF.

TABLE 3

Blending oils

| Component | % w/w in blend |
|---|---|
| Fat base Example 2 | 58.8 |
| Coconut oil | 21.2 |
| Palm Oil | 5.9 |
| Corn oil | 8.2 |
| Rapeseed oil | 5.9 |

TABLE 4

| Fatty acid | % out of total fatty acids |
|---|---|
| C12 | 10.2 |
| C14 | 4.3 |
| C16 | 22.1 |
| C18 | 3.2 |

TABLE 4-continued

| Fatty acid | % out of total fatty acids | |
|---|---|---|
| C18:1 | 41.9 | |
| C18:2 | 13.1 | |
| C18:3 | 1.3 | |
| % C16 in sn-2 from total C16 | | 44.2 |
| total SAFA | | 39.8 |
| total SAFA at sn-2 | | 47.0 |
| % SAFA in sn-2 from total SAFA | | 39.3 |

Thus, in accordance with this aspect of the invention there are provided a process and triglyceride compositions employed therein, wherein the triglycerides are blends of palm stearin interesterified with palm oil, palm stearin interesterified with rapeseed oil, and the like. The typical fatty acid composition of the resulting triglycerides starting material is less than 60%, preferably between about 48 to about 57% saturated fatty acids out of total fatty acids. At this stage, the maximal ratio between SAFA at the sn-2 position to total SAFA is about 1:3 (33%). The free fatty acids (FFA) used are a source rich in oleic acid and low in saturated fatty acids. Typical values are 2-5% C16:0, 60-80% C18:1, 1-4% C18:0. Possible sources are rapeseed fatty acids, palm kernel oil C18 fraction fatty acids, high oleic sunflower oil FFA and others. Also a combination between at least two different sources of fatty acids is possible. The ratio between triglycerides (TAG) and FFA is typically from about 40:60 (TAG:FFA) to about 50:50.

The fatty acid used for enriching sn, positions 1 and 3 with unsaturated fatty acids can come from free fatty acids, as exemplified here, but also from alkyl esters of fatty acids, preferably methyl or ethyl esters, as well as glyceride esters.

In a further aspect the current invention relates to a fat composition that is produced by interesterification of a triglycerides source with a relatively low amount of free fatty acids. In addition, the free fatty acid source is rich in both oleic acid and lauric acid. It is known from the prior art that fat bases can be produced by using a large excess of unsaturated fatty acids during the interesterification. Excesses of up to 5 parts FFA to fat were used. In most cases excesses of 3:1 or 2:1 FFA to fat, have been used. In all cases these fatty acids mixture were rich in oleic acid, as well as other C18 unsaturated fatty acids. These fatty acids mixtures did not contain saturated fatty acids, especially lauric acid. The present invention utilizes a ratio of 1.5:1 and even as low as 1:1 ratios of FFA to fat, in a continuous-bed, batch system. Furthermore, the use of fatty acids mixture which contains lauric acid enables maintaining relatively low sn-2 saturated fatty acids to total saturated fatty acids ratio, without increasing the risk of formation of insoluble calcium saturated fatty acids complexes. This can be attributed to the fact that lauric acid, although saturated, does not form insoluble calcium complexes as do the longer, C16 and up, saturated fatty acids [Tantibhedhyangkul and Hashim (1978) *Pediatrics.* 61(4):537-45; Finley and Davidson (1980) *Pediatrics.* 65(1):132-8; Lien (1994) *J. Pediatr.* 125(5):S62-8; Lien et al. (1997) *J Pediatr Gastroenterol Nutr.* 25(2): 167-74].

Thus, in a second aspect the invention relates to a process for preparing fat-base concentrates characterized in using small or equi-weight amounts of oleic acid rich fatty acids mixtures, which are also relatively rich in lauric acid (above 3%). The triglycerides are rich in palmitic acid, preferably over 70%, and contain very small amounts of linolenic acid.

Also in this embodiment, the palmitic-rich triglycerides may be randomized by a standard chemical or enzymatic interesterification process as described below.

In this aspect of the invention, the palmitic-rich triglycerides are reacted with fatty acids mixtures which have relatively high levels of lauric acid, thus reducing the sn-2 SAFA to total SAFA ratio, whilst maintaining a high sn-2 palmitic to total palmitic ratio and not adversely affecting calcium and fatty acid intake by the infant (see above), as compared with similar blends obtained from fat bases with high sn-2 palmitic to total palmitic ratios.

The ratio between the fatty acids and triglycerides in the interesterification process is from 1.5:1 (Example 3, Table 5) to 2:1 (Example 4, Table 6).

TABLE 5

Example 3.

| | | | Product | | |
|---|---|---|---|---|---|
| Fatty acid | Triglyceride (40%) % out of total fatty acids | Free fatty acid (60%) % out of total fatty acids | % at sn-2 out of total sn-2 | % at sn-2 out of total sn-2 fatty acids | Ratio % in sn-2 from total fatty acid |
| C12 | 0.2 | 20.0 | 8.6 | 0.9 | 3.5 |
| C14 | 1.4 | 0.2 | 0.8 | 0.1 | 4.2 |
| C16 | 80.0 | 3.2 | 40.8 | 61.0 | 49.8 |
| C18 | 5.0 | 2.0 | 3.9 | 4.0 | 34.2 |
| C18:1 | 10.9 | 65.0 | 39.6 | 29.0 | 24.4 |
| C18:2 | 2.2 | 9.0 | 6.3 | 4.0 | 21.2 |
| C18:3 | 0.3 | | | | |
| Total SAFA | | 54.1 | 66.0 | 40.7 | |

TABLE 6

Example 4.

| | | | Product (B)-after FFA distillation | | |
|---|---|---|---|---|---|
| Fatty acid | Triglyceride (33%) % out of total fatty acids | Free fatty acid (67%) % out of total fatty acids | % out of total fatty acids | % at sn-2 out of total sn-2 fatty acids | Ratio % in sn-2 from total fatty acid |
| C12 | 0.2 | 15.0 | 7.5 | 0.2 | 0.9 |
| C14 | 1.4 | 0.2 | 0.7 | 0.1 | 4.8 |
| C16 | 80.0 | 3.4 | 38.0 | 59.0 | 51.8 |
| C18 | 5.0 | 3.0 | 3.8 | 4.0 | 35.1 |
| C18:1 | 10.9 | 68.0 | 42.5 | 31.0 | 24.3 |
| C18:2 | 2.2 | 10.0 | 7.2 | 5.0 | 23.1 |
| C18:3 | 0.3 | | | | |
| Total SAFA | | 50.0 | 63.3 | 42.2 | |

As can be seen in Examples 3 and 4, the resulting fat bases have sn-2 SAFA to total SAFA ratio of less than 43.5, while the sn-2 palmitic to total palmitic ratio is about 50%.

The triglycerides are typically low Iodine Value (IV) palm stearin with up to 80% palmitic acid. The triglycerides can be a blend of interesterified palm stearin with palm oil, palm stearin with rapeseed oil, palm oil, etc. The ratio between sn-2 SAFA to total SAFA of the triglycerides is maximum 33%.

The free fatty acids are a source rich in oleic acid, low in saturated long chain fatty acids of C14 and up, and enriched with lauric acid. Typical values are 2-5% C16:0, 60-80% C18:1, 1-4% C18:0, 5-30% C12 out of the total fatty acids. Possible sources are rapeseed fatty acids, palm kernel oil C18 fraction fatty acids, lauric oils (such as palm kernel oil and coconut oil), high oleic sunflower oil free fatty acids and others. Also a combination between two or more different sources of fatty acids is possible.

Table 7 below exemplifies the preparation of a blend, based on the fat-base of Example 4, with additional vegetable oils as detailed in the Table. The admixed vegetable oils of the example were randomized prior to their blending with the fat base as described below.

The fatty acid composition of the resulting blend can be seen in Table 8. The sn-2 SAFA to total SAFA of the blend is 37% while the sn-2 palmitic to total palmitic is 44%. Thus this blend is comparable in sn-2 palmitic to total palmitic ratio, total palmitic content and the consequent contribution to calcium intake to similar blends obtained from fat bases of significantly higher sn-2 palmitic to total palmitic ratios.

TABLE 7

| Preparation of blend | |
|---|---|
| Blending oil | % in blend |
| Product from Example 4 | 37.7 |
| Coconut oil | 18.9 |
| Palm oil | 9.4 |
| Corn Oil | 9.4 |
| Rapeseed Oil | 24.5 |
| Total | 99.9 |

TABLE 8

| | Final blend | |
|---|---|---|
| Fatty acid | % out of total fatty acid | % at sn-2 out of total sn-2 fatty acids |
| C12 | 11.8 | 9.0 |
| C14 | 3.8 | 3.9 |
| C16 | 22.2 | 29.3 |
| C18 | 2.9 | 3.0 |
| C18:1 | 38.8 | 34.5 |

TABLE 8-continued

| | Final blend | |
|---|---|---|
| Fatty acid | % out of total fatty acid | % at sn-2 out of total sn-2 fatty acids |
| C18:2 | 14.0 | 13.6 |
| C18:3 | 2.7 | 2.6 |
| Total SAFA | 40.7 | 45.2 |

In a further embodiment, the present invention relates to an interesterification fat product that can be used as the fat fraction of infant formula, without prior blending with additional vegetable or other oils, and that is characterized by a total saturated (specifically palmitic acid) fatty acids level similar to HMF and a ratio of sn-2 saturated (palmitic) fatty acids to total saturated (palmitic) fatty acids higher than 33%, containing all the necessary fatty acids required in infants nutrition.

In a further aspect, the invention relates to the direct production of a HMF substitute, with a fatty acid composition and sn-2 palmitic to total palmitic ratio, and sn-2 SAFA to total SAFA ratios, similar to that of the blends described above, without the necessity to first obtain a suitable fat base, to be then blended with the other ingredients. According to this aspect of the invention, the product of the interesterification can be used as a final HMF replacer for infant formulas in terms of its fatty acid composition and ratios improved over simple blends of vegetable oils, resulting in improved calcium and fatty acid intake.

This can be achieved by reacting a suitable triglyceride mixture (which may be randomized prior to the reaction, as described herein) with a fatty acid mixture characterized by its high level of oleic acid and total fatty acid profile designed to substantially mimic the sn-1,3 fatty acid profile of HMF. The triglycerides can be of high palmitic acid levels or of lower palmitic acid levels (as described above), according to the target grade and level of similarity to HMF of the desired HMF substitute.

The fatty acids mixture used in the interesterification can include fatty acids from C8 to C24, including saturated such as lauric, myristic, stearic, mono-di-unsaturated, such as oleic, palmitoleic, and linoleic, and polyunsaturated, such as linolenic, arachidonic, docosahexaenoic, etc.

The desired fatty acid mixture is obtained by mixing vegetable oils and fats as shown in Table 9, which serves as an example for raw triglycerides source. The separated to glycerol and free fatty acids using standard procedure. The composition of the derived free fatty acids is the same as the composition of the raw triglycerides.

The ratio between the fatty acids mixtures and triglycerides in the interesterification reaction can be 5:1 to 1:2, preferably 3:1 to 1:1 and the reaction can be carried out by a continuous bed process or a fixed bed process using biocatalysts, preferably immobilized, preferably of 1,3 lipase activity.

This process can yield products such as described in Applicant's said WO2005/036987 and in EP 0 209 327 (different blends).

The resulting HMF substitutes can be of sn-2 palmitic to total palmitic ratios of above 33%, preferably over 40%, and up to 80%.

Table 10 below exemplifies a HMF substitute that was produced using free fatty acid mixture of Example 5 (Table 9) and randomized palm olein at a ratio of 1.2:1. The sn-2 SAFA to total SAFA of the HMF substitute is 34.5% while the sn-2 palmitic to total palmitic is 45.3%. Thus, this composition is comparable in sn-2 palmitic to total palmitic, total palmitic content and the consequent contribution to calcium intake to similar blends obtained from fat bases.

TABLE 9

| | Coconut oil | Palm oil | High oleic sunflower oil | Corn oil | Rapeseed oil | Final blend-example 5 |
|---|---|---|---|---|---|---|
| % w/w in blend | 44.2 | 2.3 | 14.0 | 9.3 | 30.2 | 100 |
| | % fatty acid out of total fatty acids | | | | | |
| C12 | 47.7 | 0.2 | — | — | — | 21.1 |
| C14 | 18.0 | 1.1 | — | — | — | 8.0 |
| C16 | 8.9 | 43.8 | 3.3 | 10.6 | 4.3 | 7.7 |
| C18 | 2.7 | 4.4 | 3.1 | 1.7 | 1.6 | 2.4 |
| C18:1 | 7.0 | 39.5 | 83.2 | 29.5 | 61.0 | 36.8 |
| C18:2 | 1.8 | 10.0 | 8.6 | 56.5 | 19.0 | 13.2 |
| C18:3 | — | — | — | 0.9 | 10.4 | 3.2 |

TABLE 10

| | Triglyceride Fatty acids % in the reaction mixture | | Product after FFA distillation | | |
|---|---|---|---|---|---|
| | 45 | 55 | | | |
| | | | Description | | |
| % fatty acid out of total fatty acids | Randomized palm olein total FAC | Free fatty acids fraction from Example 5 total FAC | % out of total fatty acids | % at sn-2 out of total sn-2 fatty acids | % in sn-2 from total fatty acid |
| C12 | 0 | 21.1 | 10.3 | 4.6 | 14.9 |
| C14 | 1.1 | 8.0 | 4.5 | 2.6 | 19.4 |
| C16 | 39.6 | 7.7 | 24.0 | 32.6 | 45.3 |
| C18:0 | 4.1 | 2.4 | 3.3 | 3.7 | 38.1 |
| C18:1 | 43.3 | 36.8 | 40.1 | 41.9 | 34.8 |
| C18:2 | 10.4 | 13.2 | 11.8 | 11.0 | 31.2 |
| C18:3 | 0 | 3.2 | 1.6 | 0.7 | 14.9 |
| Total SAFA | 44.8 | 39.1 | 42.0 | 43.6 | 34.5 |

In a further aspect, the invention relates to the randomization of the resulting fat base triglycerides starting material and to the randomization of the admixed oils prior their blending with the fat base. Both these aspects of the invention have major advantages, exemplified and discussed in more detail below. It may be mentioned that while being a known process per se, neither randomization of triglycerides starting material for the production of nutritional products, particularly for infants, babies, toddlers and children, nor randomization of blending oils used in the preparation of infant formulas, have been described. This is one of the unique developments shown in the present application.

The resulting triglycerides which serve as starting material for preparation of the fat base composition, are preferably randomized by a standard interesterification process, either chemically by using acidic or basic catalyst (e.g. sodium methoxide), or enzymatically by using a non-selective lipase. As explained above, by randomization, the saturated fatty acids at the sn-2 position will reach the percentage of the saturated fatty acids in the fat blend. The elevation in sn-2 saturated fatty acids will contribute to a fat base richer in sn-2 saturated fatty acids, and thus enable using a smaller quantity of fat base in the HMF substitute blend, and thus significant saving in costs.

For example, standard palm oil contains about 40% C16 out of the total fatty acids, and only 5-20% C16 out of the total C16 are esterified at the sn-2 position. Following random interesterification of the palm oil, 33% C16 out of the total C16 are bonded at the sn-2 position.

Another example is palm stearin IV 15 with 79% C16 content out of the total fatty acids, of which only 27.4% are esterified at the sn-2 position. Following chemical randomization, using sodium methoxide, the product shows 79% C16 content out of total fatty acids, with 33% C16 out of the total C16 esterified at the sn-2 position.

Table 11 below compares a fat base produced using randomized palm stearin with a fat base produced using non-randomized palm stearin. Randomized and non-randomized palm stearin IV15 were reacted separately with commercial oleic free fatty acids at a ratio of 1:4 of palm stearin to free fatty acids. After the reaction ended, the catalyst was separated, the free fatty acids were removed using steam distillation and the triglyceride fraction was analyzed. Table 11 demonstrates that using non-randomized palm stearin, results in a fat base with 29.8% C16 fatty acids out of the total fatty acids, of which only 63.1% are esterified at the sn-2 position. However, by using randomized palm stearin, the percentage of C16 fatty acids out of the total fatty acids and the percentage of C16 esterified at the sn-2 position out of the total C16, elevate to 32.2% and 68.1%, respectively.

TABLE 11

| | Fat base produced from non-randomized palm stearin | Fat base produced from randomized palm stearin |
|---|---|---|
| % C16 out of total fatty acids | 29.8 | 32.2 |
| % C16 at sn-2 | 56.4 | 65.8 |
| % C16 at sn-2 from total C16 | 63.1 | 68.1 |

The randomization of the triglycerides starting material is beneficial also for the production of better quality fat bases other than the fat bases described in the present invention. Thus, in another embodiment, the invention relates to a process for preparing fat base compositions in which the raw triglycerides source is randomized either chemically or enzymatically.

The admixed vegetable oils used for blending are preferably randomized, either chemically or enzymatically, prior to their blending with the fat base composition. The randomization process randomly distributes the fatty acids of oil or fat between the three sn-positions on the glycerol backbone. Thus, the low sn-2 palmitic to total palmitic ratio of vegetable oils is elevated to 33%. The randomization process is carried out routinely on many oils and fats in the industry, mainly in order to change their physical properties for a specific application (e.g. changing the melting point of a fat). However, as described below, in this aspect of the invention the randomization is carried out for improvement of the sn-2 saturated to total saturated ratio of the admixed oils, thereby reducing to a minimum any negative effect of the admixed oils on the sn-2 saturated to total saturated ratio of the blend.

Increasing the percentage of C16 at the sn-2 position out of the total C16 of the blending oils enables using less fat base for achieving a specific C16 percentage and a specific ratio of sn-2 palmitic to total palmitic. Since one major cost obstacle in preparing fat blends is the need to use high amounts of fat base, randomization of blending oils is a simple, yet effective way for saving costs in preparing fat blends. Table 12 shows that in order to obtain a typical formula containing about 21% C16 where 42% of them are esterified to the sn-2 position, 65% of Example 2 fat base are required when the blending oils are non-randomized. Table 13 shows that in order to obtain 21% C16 where 42% of them are esterified to the sn-2 position only 47% of the same fat base are required when the blending oils are randomized. This significant difference in the required amount of fat base emphasizes the importance of using randomized blending oils for cost saving purposes.

TABLE 12

| | Fat base of Example 2 | Non-randomized Coconut oil | Non-randomized Corn oil | Non-randomized Rapeseed oil | Final blend |
|---|---|---|---|---|---|
| % w/w in blend | 65.2 | 21.7 | 7.6 | 5.4 | 100 |
| % fatty acid out of total fatty acids | | | | | |
| C8 | — | 7.3 | — | — | 1.6 |
| C10 | — | 5.8 | — | — | 1.3 |
| C12 | 0.2 | 47.7 | — | — | 10.5 |
| C14 | 0.7 | 18.0 | — | — | 4.4 |
| C16 | 28.1 | 8.9 | 10.6 | 4.3 | 21.3 |
| % C16 at sn-2 out of total C16 | 47.9 | 10.0 | 5.0 | 5.0 | 42.4 |
| C18 | 3.6 | 2.7 | 1.7 | 1.6 | 3.2 |
| C18:1 | 54.5 | 7.0 | 29.5 | 61.0 | 42.6 |
| C18:2 | 10.8 | 1.8 | 56.5 | 19.0 | 12.8 |
| C18:3 | 1.1 | — | 0.9 | 10.4 | 1.4 |

TABLE 13

| | Fat base Example 2 | Randomized Coconut oil | Randomized Palm oil | Randomized Corn oil | Randomized Rapeseed oil | Final blend |
|---|---|---|---|---|---|---|
| % w/w in blend | 47.7 | 22.7 | 10.2 | 8.0 | 11.4 | 100 |
| % fatty acid out of total fatty acids | | | | | | |
| C8 | — | 7.3 | — | — | — | 1.7 |
| C10 | — | 5.8 | — | — | — | 1.3 |
| C12 | 0.2 | 47.7 | 0.2 | — | — | 11.0 |
| C14 | 0.7 | 18.0 | 1.1 | — | — | 4.5 |
| C16 | 28.1 | 8.9 | 43.8 | 10.6 | 4.3 | 21.2 |
| % C16 at sn-2 out of total C16 | 47.9 | 33.0 | 33.0 | 33.0 | 33.0 | 42.4 |
| C18 | 3.6 | 2.7 | 4.4 | 1.7 | 1.6 | 3.1 |
| C18:1 | 54.5 | 7.0 | 39.5 | 29.5 | 61.0 | 40.9 |
| C18:2 | 10.8 | 1.8 | 10.0 | 56.5 | 19.0 | 13.2 |
| C18:3 | 1.1 | — | — | 0.9 | 10.4 | 1.8 |

It is important to notice that the production of the blend of Table 12 utilizes less fat base of Example 2 than the fat base needed for the production of the Table 3 blend, since the Table 12 blend has a lower percentage of C16 and a lower ratio of sn-2 palmitic to total palmitic than that of Table 3.

The randomization of blending oils is beneficial also for blends made from fat bases other than the fat bases described in the present invention. The fat bases described in EP 0 209 327 or EP 0 495 456 or by applicant in said WO2005/036987 may be blended with randomized vegetable oils rather than with natural vegetable oils. This aspect of the invention enables achieving the same percentage of C16 and the same ratio of sn-2 palmitic acid residue to total palmitic acid residues as described by the above-mentioned applications, while using less fat base and thus saving in the blend production costs.

Table 14 shows that in order to achieve EP 0 209 327 blend 2 composition (26% C16 52.6% of which being esterified to the sn-2 position), 50% of the fat base of Sample 1 of EP 0 209 327 are needed, using the non-randomized blending oils used in said patent. As may be seen from Table 15, by using the randomized blending oils of the present invention only 43% of the fat base of Sample 1 of EP 0 209 327 are needed for achieving 26% C16 of which 52.6% are esterified to the sn-2 position. This significant difference in the required amount of fat base (14% saving) demonstrates the importance and advantage of using randomized blending oils for cost saving purposes also for blends made from fat bases other than the fat bases described in and subject of the present invention.

Table 16 shows that by using randomized blending oils it is possible to improve the percentage of sn-2 palmitic acid residues out of total palmitic acid residues in blends such as described in EP 0 209 327 (Blends 1-4).

TABLE 14

| | Fat base Sample 1 EP 0 209 327 | Natural PK | Natural Sunflower oil | Natural Soybean oil | final blend |
|---|---|---|---|---|---|
| % w/w in blend | 50 | 10 | 10 | 30 | 100 |
| % C16 in sn-2 out of total C16 | 59.9 | | | | 52.6 |

TABLE 15

| | Fat Base Sample 1 EP 0 209 327 | Randomized PK | Randomized Palm Olein | Randomized Sunflower Oil | Randomized Soybean Oil | Final Blend |
|---|---|---|---|---|---|---|
| % w/w in blend | 43 | 10 | 7 | 10 | 30 | 100 |
| % fatty acid out of total fatty acids | | | | | | |
| C8 | — | 3.4 | — | — | — | 0.3 |
| C10 | — | 3.2 | — | — | — | 0.3 |
| C12 | — | 48.4 | 0.2 | — | — | 5.0 |
| C14 | — | 15.8 | 1.1 | — | — | 2.0 |
| C16 | 44.5 | 8.2 | 39.0 | 6.0 | 10.0 | 26.0 |
| % C16 in sn-2 from total C16 | 59.9 | 33.0 | 33.0 | 33.0 | 33.0 | 52.6 |
| C18 | 6.0 | 2.2 | 3.0 | 3.4 | 4.0 | 5.0 |
| C18:1 | 41.5 | 15.9 | 42.0 | 24.3 | 23.0 | 33.5 |
| C18:2 | 4.5 | 2.4 | 11.0 | 65.1 | 54.0 | 23.0 |
| C18:3 | — | — | — | 0.2 | 7.5 | 2.3 |

TABLE 16

| | | Blend 1 of EP 0 209 327 | Blend 2 of EP 0 209 327 | Blend 3 of EP 0 209 327 | Blend 4 of EP 0 209 327 |
|---|---|---|---|---|---|
| C16 as % in sn-2 out of total C16 | reported, using natural vegetable oils | 57.6 | 52.6 | 62.8 | 62.3 |
| | using randomized vegetable oils | 58.1 | 55.5 | 64.4 | 64.2 |

The randomization of the blending oils has, inter alia, another important aspect besides cost-effectiveness. Randomized blending oils may contribute to γ-linolenic acid (C18:3) and linoleic acid (C18:2) distribution with higher similarity to HMF, in comparison with the natural oil contribution.

Rapeseed oil and soybean oil are the main sources for vegetal linolenic acid and are commonly used in the manufacture of infant formulas. Table 17 shows the differences between HMF, natural and randomized rapeseed and soybean oils in the sn-2 distribution of linoleic and linolenic acids. In rapeseed oil 45-61% of the linolenic acid residues, and 32-47% of the linoleic acid residues are esterified at the sn-2 position. The distribution of linolenic acid and linoleic acid in rapeseed oil differs largely from that of HMF. In HMF only 5-20% of the linolenic acid and 20-23% of the linoleic acid are esterified at the sn-2 position. Randomization of rapeseed oil results in 33% of the γ-linolenic acid and 33% of the linoleic acid bonded at the sn-2 position, thus, improving the similarity of the fat substitute to HMF.

In soybean oil, the distribution of linolenic acid (27-29% of the γ-linolenic acid are bonded at the sn-2 position) resembles that of randomized soybean oil (33%). However, in natural soybean oil, 40-43% of the linoleic acid are esterified at the sn-2 position, while in randomized soybean oil only 33% of the linoleic acid are esterified at the sn-2 position. In HMF only 20-23% of the linoleic acid residues are bonded at the sn-2 position. Thus, the utilization of randomized soybean oil instead of natural soybean oil improves the resemblance of linoleic acid distribution to that of HMF, while maintaining a similar γ-linolenic acid distribution.

TABLE 17

| | HMF | Natural Rapeseed Oil | Randomized Rapeseed Oil | Natural Soybean Oil | Randomized Soybean Oil |
|---|---|---|---|---|---|
| % C18:2 at sn-2 out of total C18:2 | 20-23 | 32-47 | 33 | 40-43 | 33 |
| % C18:3 at sn-2 out of total C18:3 | 5-20 | 45-61 | 33 | 27-29 | 33 |

The randomization of the admixed vegetable oils may be performed by a standard interesterification process, either chemically by using acidic or basic catalyst (e.g. sodium methoxide) or enzymatically by using a non-selective lipase.

All of the HMF substitutes of the different aspects of the invention can be used as the fat fractions of infant formula and as fat fraction of baby foods, toddlers' foods, children and young people foods, as well as adult nutrition.

The terms "fat" and "lipid" are used herein interchangeably.

Lipids, under the scope of this invention, include triglycerides and derivatives, such as mono- and di-glycerides.

The terms "fatty acids", "fatty acyl" and "fatty acid residues" (and all their equivalents referring to specific fatty acids) are used herein interchangeably.

The term "infant formula" as used herein encompasses infant formulas (for newborn to 6 months old infants), follow-up formulas (for 6-12 months old babies) and growing-up formulas (for 1-3 years old children).

Disclosed and described, it is to be understood that this invention is not limited to the particular examples, process steps, and materials disclosed herein as such process steps and materials may vary somewhat. It is also to be understood that the terminology used herein is used for the purpose of describing particular embodiments only and not intended to be limiting since the scope of the present invention will be limited only by the appended claims and equivalents thereof.

It must be noted that, as used in this specification and the appended claims, the singular forms "a", "an" and "the" include plural referents unless the content clearly dictates otherwise.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The Examples herein are representative of techniques employed by the inventors in carrying out aspects of the present invention. It should be appreciated that while these techniques are exemplary of preferred embodiments for the practice of the invention, those of skill in the art, in light of the present disclosure, will recognize that numerous modifications can be made without departing from the spirit and intended scope of the invention.

The invention claimed is:

1. A process for the preparation of a substitute human milk fat (HMF) composition comprising admixing (i) a fat base composition that is a mixture of enzymatically structured triglycerides, with (ii) at least one vegetable oil, wherein said (i) fat base composition and said (ii) at least one vegetable oil are mixed at a ratio of (i):(ii) of from 0.13:1 to 4:1,
wherein the vegetable oil is enzymatically randomized prior to being mixed with the fat base composition; and
wherein said fat base composition is a mixture of structured triglycerides, comprising 0-20% C12:0 fatty acids of the total fatty acids; 0-15% C14:0 fatty acids of the total fatty acids; 20-55% C16:0 fatty acids of the total fatty acids, of which above 38% are esterified at the sn-2 position of the glycerol backbone of said triglycerides; 1-7% C18:0 fatty acids of the total fatty acids; 25-65% C18:1 fatty acids of the total fatty acids; 2-40% C18:2 fatty acids of the total fatty acids; 0-8% C18:3 fatty acids of the total fatty acids; other fatty acids are present in levels of less than 8% of the total fatty acids.

2. The process of claim 1, wherein said fat base has 10-15% C12:0 fatty acids out of the total fatty acids; 5-10% C14:0 fatty acids out of the total fatty acids; 3-5% C18:0 fatty acids out of the total fatty acids; 30-40% C18:1 fatty acids out of the total fatty acids; 10-20% C18:2 fatty acids out of the total fatty acids; and 1.5-3% C18:3 fatty acids out of the total fatty acids.

3. The process of claim 1, wherein said at least one vegetable oil is enzymatically randomized to have 33% of the palmitic acid residues thereof esterified at the sn-2 position of the glycerol backbone of the triglycerides of said at least one vegetable oil.

4. The process of claim 1, wherein said vegetable oil is selected from the group consisting of soy oil, palm tree oil, canola oil, coconut oil, palm kernel oil, sunflower oil, corn oil and rapeseed oil.

5. An infant formula comprising the substitute human milk fat composition prepared by the process of claim 1 and at least one protein component.

6. The infant formula of claim 5, further optionally comprising at least one of vitamins, minerals, nucleotides, amino acids and carbohydrates.

* * * * *